United States Patent
Hisano (10) Patent No.: US 9,878,701 B2
(45) Date of Patent: Jan. 30, 2018

(54) HYBRID VEHICLE

(71) Applicant: TOYOTA JIDOSHA KABUSHIKI KAISHA, Toyota-shi, Aichi-ken (JP)

(72) Inventor: Taishi Hisano, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 203 days.

(21) Appl. No.: 14/753,260

(22) Filed: Jun. 29, 2015

(65) Prior Publication Data

US 2016/0001767 A1  Jan. 7, 2016

(30) Foreign Application Priority Data

Jul. 4, 2014 (JP) ................................ 2014-138790

(51) Int. Cl.
| | |
|---|---|
| *B60W 20/00* | (2016.01) |
| *B60W 10/08* | (2006.01) |
| *B60K 6/48* | (2007.10) |
| *B60K 6/445* | (2007.10) |
| *B60W 20/15* | (2016.01) |

(52) U.S. Cl.
CPC .......... *B60W 20/108* (2013.01); *B60K 6/445* (2013.01); *B60K 6/48* (2013.01); *B60W 10/08* (2013.01); *B60W 20/00* (2013.01); *B60W 20/15* (2016.01); *B60W 2510/244* (2013.01); *Y02T 10/6239* (2013.01); *Y02T 10/6269* (2013.01); *Y10S 903/903* (2013.01)

(58) Field of Classification Search
CPC combination set(s) only.
See application file for complete search history.

(56) References Cited

U.S. PATENT DOCUMENTS

| | | | |
|---|---|---|---|
| 2008/0173485 A1 | 7/2008 | Kumazaki et al. | |
| 2011/0288710 A1* | 11/2011 | Ito | B60L 11/123 701/22 |
| 2012/0046814 A1* | 2/2012 | Sugimoto | B60K 6/445 701/22 |
| 2013/0030633 A1* | 1/2013 | Yamamoto | B60W 10/08 701/22 |

FOREIGN PATENT DOCUMENTS

| | | |
|---|---|---|
| CN | 101224747 A | 7/2008 |
| EP | 2 815 945 A1 | 12/2014 |
| JP | 2009-143563 A | 7/2009 |
| JP | 2011-93335 | 5/2011 |
| WO | WO 2013/121574 A1 | 6/2013 |

OTHER PUBLICATIONS

Zhu Jun, "Principles and Applications of Powertrain Controls for Hybrid and Electric Vehicles", Shanghai Scientific & Technical Publishers, Jan. 2013, pp. 80-85.

* cited by examiner

Primary Examiner — Redhwan K Mawari
Assistant Examiner — Rodney P King
(74) *Attorney, Agent, or Firm* — Finnegan, Henderson, Farabow, Garrett & Dunner, LLP (57) ABSTRACT

An ECU causes a vehicle to travel while selecting one of a CD mode in which an SOC of a power storage device is consumed and a CS mode in which the SOC is maintained to a prescribed level. The ECU controls vehicle driving force to be smaller in the CD mode than in the CS mode at the same accelerator pedal position.

5 Claims, 7 Drawing Sheets

HYBRID VEHICLE

This nonprovisional application is based on Japanese Patent Application No. 2014-138790 filed on Jul. 4, 2014, with the Japan Patent Office, the entire contents of which are hereby incorporated by reference.

BACKGROUND OF THE INVENTION

Field of the Invention

The present invention relates to a hybrid vehicle, and particularly to a hybrid vehicle that travels while selecting one of a CD (Charge Depleting) mode and a CS (Charge Sustaining) mode.

Description of the Background Art

There is a known hybrid vehicle for which a user can select a power mode or an economy mode through an input switch. According to such a hybrid vehicle, the characteristics of the vehicle driving force (required power) relative to an accelerator pedal position is switched from a normal mode by selecting the power mode or the economy mode. When the economy mode is selected, the vehicle driving force is controlled such that the increase in the vehicle driving force relative to the increase in the accelerator pedal position is more gradual than in the case of the normal mode. Thereby, the vehicle can travel with low fuel consumption (for example, see Japanese Patent Laying-Open No. 2011-93335).

According to a hybrid vehicle that travels while selecting one of a CD mode in which an SOC (State Of Charge) of a power storage device is consumed and a CS mode in which the SOC is maintained to a prescribed level, the vehicle is required to travel particularly with low fuel consumption in the case of the CD mode in which the vehicle basically travels using energy stored in the power storage device. In the CD mode as described above, the so-called EV traveling is mainly employed, specifically, the vehicle travels using a motor while stopping an engine. In this case, however, since the engine operates when a relatively large vehicle driving force is required also in the CD mode, sufficiently low fuel consumption may not be able to be achieved. From this point of view, no consideration is taken in the above-mentioned Japanese Patent Laying-Open No. 2011-93335.

SUMMARY OF THE INVENTION

Therefore, an object of the present invention is to provide a hybrid vehicle that travels while selecting one of a CD mode and a CS mode, which allows improvement in fuel efficiency in the CD mode.

According to the present invention, a hybrid vehicle includes: a power storage device; a drive device that receives electric power stored in the power storage device to generate vehicle driving force; an internal combustion engine; and a control device. The drive device is further configured to generate electric power for charging the power storage device using an output of the internal combustion engine. The control device causes the vehicle to travel while selecting one of a CD mode in which an SOC of the power storage device is consumed and a CS mode in which the SOC is maintained to a prescribed level. The control device controls the vehicle driving force to be smaller in the CD mode than in the CS mode at the same accelerator pedal position.

In this hybrid vehicle, the vehicle driving force is smaller in the CD mode than in the CS mode at the same accelerator pedal position. Accordingly, in the CD mode, the frequency of operating the internal combustion engine for ensuring the vehicle driving force is suppressed. Therefore, according to this hybrid vehicle, the fuel efficiency in the CD mode can be improved.

Preferably, in a case of selecting a prescribed mode (ECO mode) in which reduction in fuel consumption is prioritized over acceleration of the vehicle, the control device controls the vehicle driving force to be smaller in the CD mode than in the CS mode at the same accelerator pedal position.

When the prescribed mode (ECO mode) is selected in the CD mode, the vehicle is required to travel particularly with low fuel consumption. In such a case, this hybrid vehicle allows an improvement in fuel efficiency by the above-described configuration.

Preferably, the control device controls the vehicle driving force such that a maximum value of the vehicle driving force is smaller in the CD mode than in the CS mode.

By such a configuration, the vehicle driving force is reliably suppressed also against an excessive accelerator pedal operation. Therefore, according to this hybrid vehicle, the fuel efficiency in the CD mode can be reliably improved.

Preferably, the drive device includes an electric motor that generates vehicle driving force. The maximum value of the vehicle driving three in the CD mode is set such that a torque of the electric motor does not exceed a prescribed limit torque. The prescribed limit torque is set based on efficiency of the electric motor and is smaller than a maximum torque that can be output from the electric motor.

By such a configuration, in the CD mode, the electric motor operates in a range in which the efficiency does not greatly decrease. Therefore, according to this hybrid vehicle, loss of the electric motor can be suppressed in the CD mode, so that the fuel efficiency in the CD mode can be improved.

Preferably, the hybrid vehicle further includes a charging mechanism for charging the power storage device using electric power from a power supply external to the vehicle.

The hybrid vehicle provided with such a charging mechanism is required to travel particularly with low fuel consumption in the CD mode. According to this hybrid vehicle, the frequency of operating the internal combustion engine in the CD mode is suppressed, so that the fuel efficiency in the CD mode can be improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The embodiments of the present invention will be hereinafter described in detail with reference to the accompanying drawings. In the following, although a plurality of embodiments will be described, it has been originally intended in the present application to combine the configurations described in each embodiment as appropriate. In the accompanying drawings, the same or corresponding components are designated by the same reference characters, and description thereof will not be repeated.

First Embodiment

Figure 1:
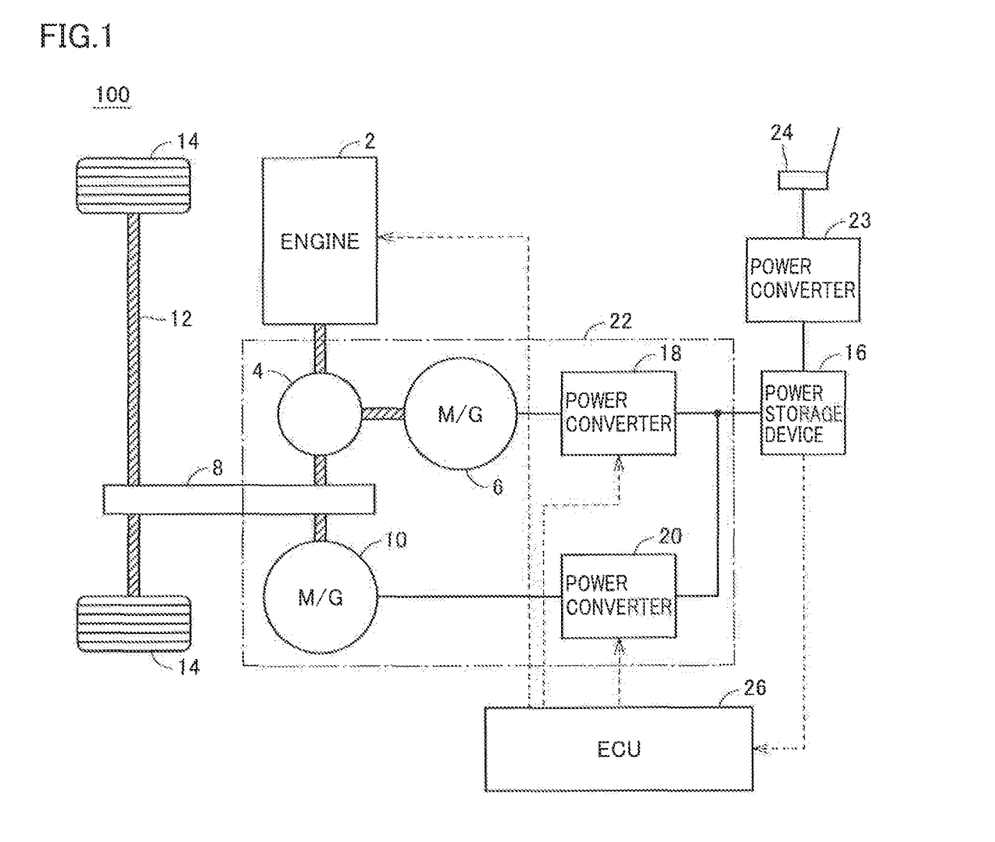
FIG. 1 is a block diagram for illustrating the entire configuration of a hybrid vehicle according to the first embodiment of the present invention.

FIG. 1 is a block diagram for illustrating the entire configuration of a hybrid vehicle according to the first embodiment of the present invention. Referring to FIG. 1, a hybrid vehicle 100 includes an engine 2, a drive device 22, a transmission gear 8, a drive shaft 12, a wheel 14, and a power storage device 16. Furthermore, hybrid vehicle 100 further includes a power converter 23, a connection unit 24, and an ECU (Electronic Control Unit) 26.

Engine 2 is an internal combustion engine that outputs motive power by converting thermal energy produced by combustion of fuel into kinetic energy of a motion element such as a piston and a rotor. Examples of fuel for engine 2 may be suitably hydrocarbon-based fuel such as gasoline, light oil, ethanol, liquid hydrogen and natural gas, or liquid or gaseous hydrogen fuel.

Drive device 22 includes a power split device 4, motor generators 6 and 10, and power converters 18 and 20. Motor generators 6 and 10 each are an alternating-current (AC) rotating electric machine, and, for example, formed of a three-phase AC synchronous motor. Motor generator 6 is used as a power generator driven by engine 2 via power split device 4 and also used as an electric motor for starting engine 2. Motor generator 10 mainly operates as an electric motor and drives drive shaft 12. On the other hand, when the vehicle's brake is applied or when acceleration is slowed down while the vehicle is traveling downhill, motor generator 10 operates as a power generator to perform regenerative power generation.

Power split device 4 includes a planetary gear mechanism having three rotation shafts including a sun gear, a carrier, and a ring gear, for example. Power split device 4 divides the driving force of engine 2 into motive power transmitted to the rotation shaft of motor generator 6 and motive power transmitted to transmission gear 8. Transmission gear $ is coupled to drive shaft 12 for driving wheel 14. Furthermore, transmission gear 8 is coupled also to the rotation shaft of motor generator 10.

Power storage device 16 is a rechargeable direct-current (DC) power supply, which is, for example, formed of a secondary battery such as a Nickel-metal hydride or lithium-ion secondary battery. Power storage device 16 supplies electric power to power converters 18 and 20. Furthermore, when receiving electric power generated during power generation of motor generator 6 and/or 10, power storage device 16 is charged. It is to be noted that a large capacity capacitor can also be employed as power storage device 16.

The state of charge of power storage device 16 is shown by an SOC value expressed in percentage of the current power storage amount relative to the fully-charged state of power storage device 16. The SOC value is calculated, for example, based on the output voltage and/or the input/output current of power storage device 16 that are detected by a voltage sensor and/or a current sensor that are not shown. The SOC value may be calculated by an ECU separately provided in power storage device 16, or may be calculated by an ECU 26 based on the detected value of the output voltage and/or the input/output current of power storage device 16.

Based on the control signal received from ECU 26, power converter 18 performs a bidirectional DC/AC power conversion between motor generator 6 and power storage device 16. Similarly, based on the control signal received from ECU 26, power converter 20 performs a bidirectional DC/AC power conversion between motor generator 10 and power storage device 16. Thereby, motor generators 6 and 10 can output a positive torque used for operating as an electric motor or a negative torque used for operating as a power generator, while transmitting and receiving electric power to and from power storage device 16. In addition, a boost converter for a DC voltage conversion can be arranged between power storage device 16 and each of power converters 18 and 20.

In this way, drive device 22 including motor generators 6 and 10, power split device 4, and power converters 18 and 20 can generate vehicle driving force and also can generate electric power for charging power storage device 16 by motor generator 6 using the output from engine 2.

Based on the control signal received from ECU 26, power converter 23 converts electric power, which is supplied from a power supply (not shown) that is external to the vehicle and electrically connected to connection unit 24, into a voltage level of power storage device 16, and then, outputs the converted electric power to power storage device 16 (in the following, charging of power storage device 16 by a power supply external to the vehicle will also be simply referred to as "external charging").

ECU 26 includes a CPU (Central Processing Unit), a storage device, and an input/output buffer and the like (each of which is not shown), and controls each device in hybrid vehicle 100. It is to be noted that the above-described control is not limited to processing by software, but can he carried out by dedicated hardware (an electronic circuit).

As main control, ECU 26 sets the vehicle required power (which will be hereinafter also simply referred to as "required power") based on the accelerator pedal position in accordance with the operation amount of the accelerator pedal. Then, ECU 26 controls drive device 22 to generate the vehicle driving force corresponding to the required power.

When the vehicle driving force is relatively small, ECU 26 controls drive device 22 to cause the vehicle to travel only with motor generator 10 while stopping engine 2 (EV traveling). When the vehicle driving force becomes relatively large or the SOC decreases, ECU 26 controls drive device 22 to cause the vehicle to travel while operating engine 2 WV traveling). During HV traveling, hybrid vehicle 100 travels using the driving force from engine 2 in addition to the driving force of motor generator 10 or in place of the driving force of motor generator 10. The electric power generated by motor generator 6 in association with the operation of engine 2 is directly supplied to motor generator 10 or stored in power storage device 16.

Furthermore, ECU 26 controls traveling of the vehicle by selectively applying the CD mode in which the SOC is consumed and the CS mode in which the SOC is maintained to a prescribed level.

Figure 2:
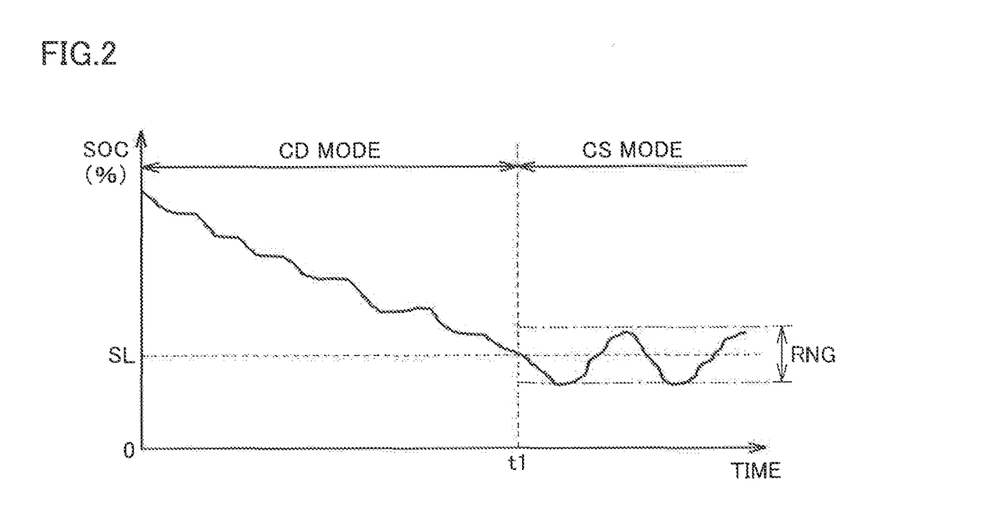
FIG. 2 is a diagram for illustrating a CD mode and a CS mode.

FIG. 2 is a diagram for illustrating the CD mode and the CS mode. Referring to FIG. 2, it is assumed that the vehicle starts travelling in the CD mode, for example, after power storage device 16 is brought into a fully-charged state by external charging.

In the CD mode, the SOC is consumed, and basically, the electric power stored in power storage device 16 (electric energy mainly by external charging) is consumed. While the vehicle travels in the CD mode, operation of engine 2 for maintaining the SOC is not carried out. Thereby, although the SOC increases temporarily by regenerative electric power recovered during deceleration and the like of the vehicle or by the electric power generated by operating engine 2, the proportion of discharging is consequently relatively greater than that of charging. Thus, as a whole, the SOC decreases as the travelling distance increases.

In the CS mode, the SOC is maintained to a prescribed level. By way of example, at time t1, when the SOC decreases to a prescribed value SL showing a decrease of the SOC, the CS mode is selected. Then, the subsequent SOC is maintained within a control range RNG defined based on prescribed value SL. Specifically, engine 2 repeatedly starts and stops the operation as appropriate (intermittent operation), thereby controlling the SOC to fall within control range RNG. In this way, in the CS mode, engine 2 operates for maintaining the SOC.

Also in the CD mode, when relatively large vehicle driving force (required power) is required, engine 2 is to operate. On the other hand, also in the CS mode, if the SOC increases, engine 2 is to stop. In other words, the CD mode is not limited to EV traveling in which the vehicle travels while keeping engine 2 stopped, and the CS mode is also not limited to HV traveling in which the vehicle travels while keeping engine 2 operating. EV traveling and HV traveling each can be carried out both in the CD mode and in the CS mode.

Again referring to FIG. 1, ECU 26 controls the vehicle driving force to be smaller in the CD mode than in the CS mode at the same accelerator pedal position (the operation amount of the accelerator pedal). Specifically, ECU 26 sets the required power to be smaller in the CD mode than in the CS mode at the same accelerator pedal position.

In the CD mode, the operation of engine 2 for maintaining the SOC is not carried out, and accordingly, the fuel efficiency is better than in the CS mode. Also in the CD mode, however, engine 2 operates for ensuring the vehicle driving force if relatively large vehicle driving force is required. When engine 2 operates, the fuel efficiency deteriorates. Thus, in hybrid vehicle 100 according to the first embodiment, the required power at the time when the CD mode is selected is set as described above, thereby suppressing the vehicle driving force during traveling in the CD mode. This reduces the frequency of operating engine 2 for ensuring the vehicle driving force in the CD mode. Consequently, the fuel efficiency in the CD mode is improved.

Figure 3:
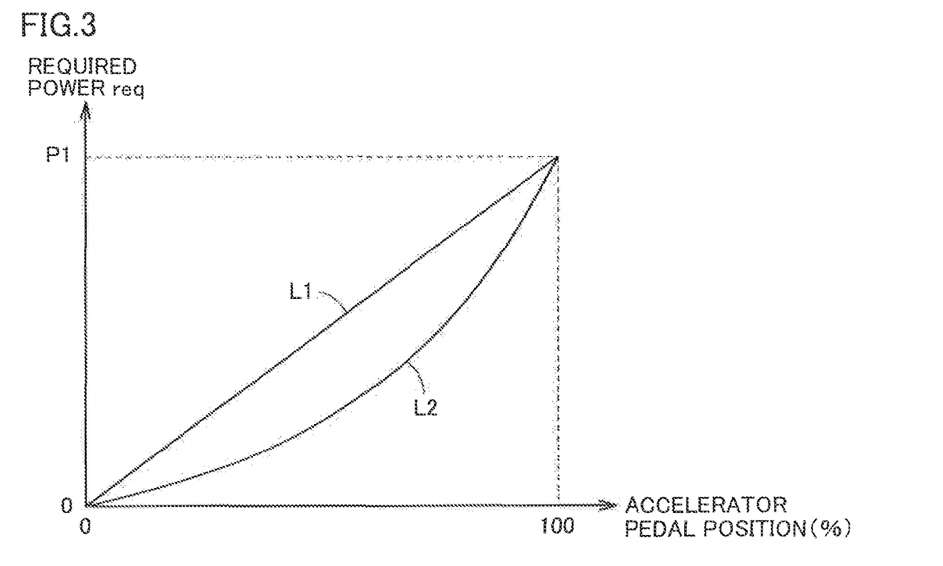
FIG. 3 is a diagram showing the relation between an accelerator pedal position and required power.

FIG. 3 is a diagram showing the relation between the accelerator pedal position and the required power. Referring to FIG. 3, the horizontal axis shows an accelerator pedal position, in which case an accelerator is fully opened when the accelerator pedal position is 100%. The vertical axis shows required power req that corresponds to vehicle driving force. In the present first embodiment, in the CS mode, required power req is set depending on the accelerator pedal position in accordance with a normal line L1 showing the basic relation between the accelerator pedal position and the required power.

On the other hand, in the CD mode, an output suppression line L2 is employed in place of normal line L1. In other words, in the CD mode, in a range in which the accelerator pedal position is from 0% (fully closed) to 100% (fully opened), required power req is set depending on the accelerator pedal position in accordance with output suppression line L2 exhibiting required power req for the same accelerator pedal position that is smaller than that in the case of normal line L1. Thereby, in the CD mode, the required power (vehicle driving force) is suppressed, to thereby suppress switching from EV traveling to RV traveling, so that the vehicle can travel with low fuel consumption.

Figure 4:
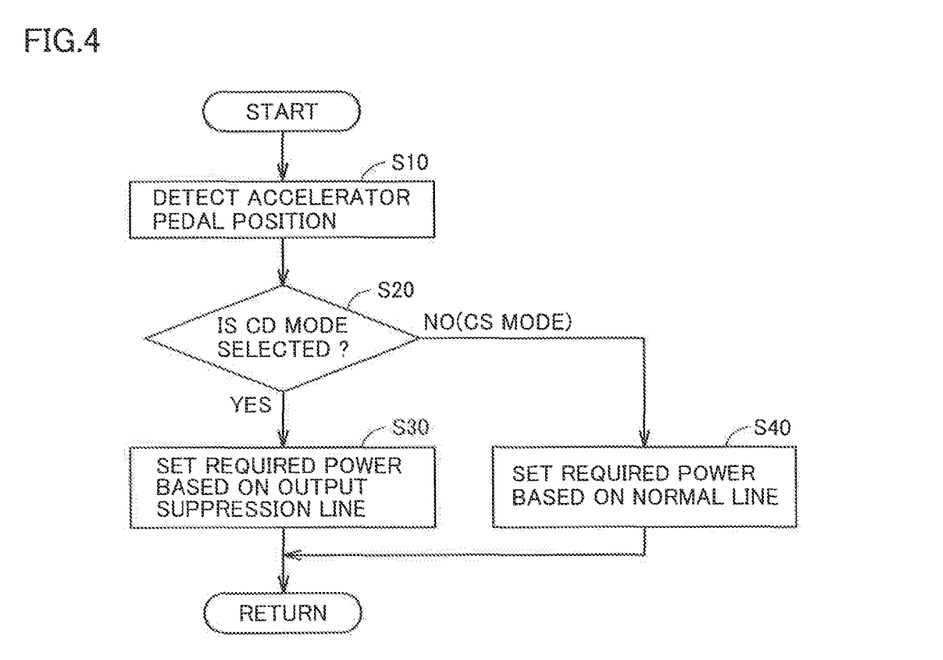
FIG. 4 is a flowchart for illustrating the procedure of a required power setting process performed by an ECU.

FIG. 4 is a flowchart for illustrating the procedure of a required power setting process performed by ECU 26. The process shown in this flow chart is performed as it is called from a main routine and executed at every prescribed time or every time predetermined conditions are satisfied.

Referring to FIG. 4, ECU 26 detects an accelerator pedal position (step S10). The accelerator pedal position is detected, for example, by a sensor (not shown) capable of detecting the operation amount of the accelerator pedal. Then, ECU 26 determines whether the CD mode is selected or not (step S20). This determination may he made, for example, based on a flag of which state is changed depending on whether the CD mode is being selected or the CS mode is being selected as shown in FIG. 2, or may be made based on the SOC value itself.

In step S20, when it is determined that the CD mode is selected (YES in step S20), ECU 26 sets required power req based on the accelerator pedal position detected in step S10 in accordance with output suppression line L2 shown in FIG. 3 (step S30).

When it is determined in step S20 that the CD mode is not selected, that is, the CS mode is selected (NO in step S20), ECU 26 sets required power req based on the accelerator pedal position detected in step S10 in accordance with normal line L1 shown in FIG. 3 (step S40).

As described above, in the present first embodiment, the vehicle driving force is smaller in the CD mode than in the CS mode at the same accelerator pedal position. Accordingly, in the CD mode, the frequency of operating engine 2 for ensuring the vehicle driving force is suppressed. Therefore, according to the present first embodiment, the fuel efficiency in the CD mode can be improved.

[Modification of the First Embodiment]

In the above-described first embodiment, the maximum value of the required power, that is, the required power (vehicle driving force) at the time when the accelerator pedal position is 100% (fully opened) is the same both in the CD mode and in the CS mode. However, the maximum value of the required power (vehicle driving force) is smaller in the CD mode than in the CS mode. Accordingly, the vehicle driving force is reliably suppressed also against the excessive accelerator pedal operation, with the result that the fuel efficiency can be reliably improved.

Figure 5:
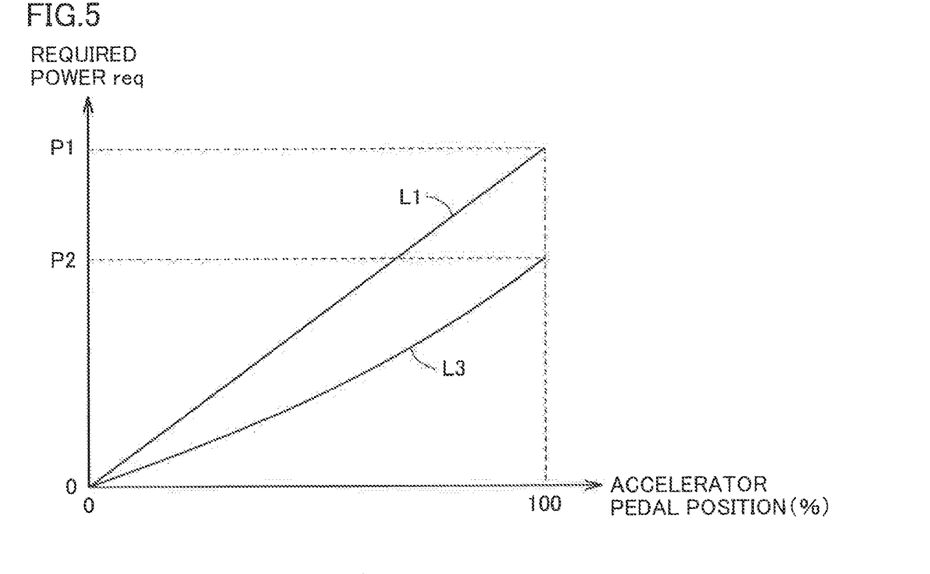
FIG. 5 is a diagram showing the relation between the accelerator pedal position and the required power in a modification of the first embodiment.

FIG. 5 is a diagram showing the relation between the accelerator pedal position and the required power in the present modification. Referring to FIG. 5 that corresponds to FIG. 3 described above, in the CS mode, required power req is set depending on the accelerator pedal position in accordance with normal line L1 as in the first embodiment.

On the other hand, in the CD mode, an output suppression line L3 is employed in place of output suppression line L2 shown in FIG. 3. As to this output suppression line L3, required power req is smaller than that in the case of normal line L1 at the same accelerator pedal position, and a value (P2) of the required power at 100% of the accelerator pedal position, that is, the maximum value of the vehicle driving force, is smaller than a value (P1) in the case of normal line L1. Accordingly, even if the user performs an excessive accelerator pedal operation, the vehicle driving force is reliably suppressed, so that the fuel efficiency can be reliably improved.

In addition, in the hybrid vehicle according to the present modification, required power P2 at the time when the accelerator pedal position is 100% in the CD mode is determined based on the efficiency of motor generator 10 for vehicle traveling. Thereby, motor generator 10 is improved in efficiency, with the result that the fuel efficiency can be further improved, which will be hereinafter described.

Figure 6:
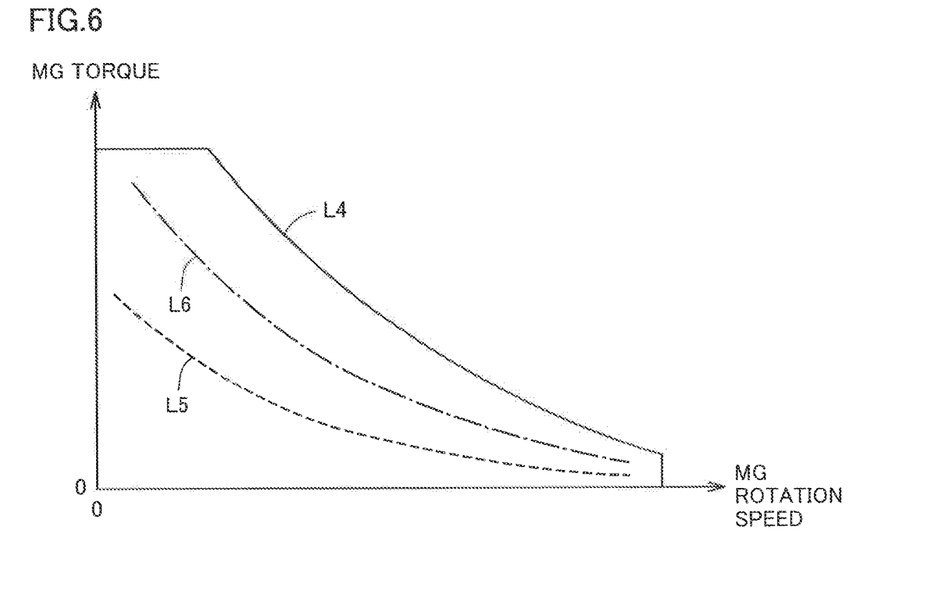
FIG. 6 is a diagram showing a characteristic curve of a motor generator for vehicle traveling.

FIG. 6 is a diagram showing a characteristic curve of motor generator 10 for vehicle traveling. Referring to FIG. 6, the horizontal axis shows the rotation speed of motor generator 10 while the vertical axis shows the torque of motor generator 10. A line L4 indicated by a solid line shows the maximum torque line of motor generator 10.

A line L5 indicated by a dotted line shows the maximum efficiency line along which the efficiency of motor generator 10 is approximately the highest at each rotation speed of motor generator 10. A line L6 shown by an alternate long and short dash line shows a line along which motor generator 10 operates, for example, at the efficiency corresponding to −5% of the maximum efficiency of motor generator 10. When the torque exceeds line L6, the efficiency of motor generator 10 is further decreased.

Then, in the present modification, the value of required power P2 shown in FIG. 5 is determined based on line L6. For example, line L6 is approximated by an equal-power line of motor generator 10, and the power shown by this equal-power line is set as required power P2. Thereby, a decrease in the efficiency of motor generator 10 is suppressed to −5% of the maximum efficiency relative to 100% of the accelerator pedal position (the maximum value of the vehicle driving force), so that the efficiency of motor generator 10 can be maintained high. Consequently, the fuel efficiency is also improved.

As described above, in the present modification, the maximum value of the required power (the vehicle driving force) is suppressed in the CD mode. Accordingly, in the CD mode, the vehicle driving force is suppressed against the excessive accelerator pedal operation, so that the operation of engine 2 is suppressed. Therefore, according to the present modification, the fuel efficiency can be reliably improved.

Furthermore, according to the present modification, in the CD mode, required power P2 at the time when the accelerator pedal position is 100% is determined based on the efficiency of motor generator 10 for vehicle traveling, as described above. Therefore, according to the present modification, the efficiency of motor generator 10 can be maintained high in the CD mode. Also in this point, the fuel efficiency can be improved.

Second Embodiment

In the present second embodiment, an ECO mode switch is provided that allows the vehicle to travel while prioritizing reduction in fuel consumption over acceleration of the vehicle. Then, in the case where the ECO mode switch is operated by the user to select the ECO mode, the required power is set such that the vehicle driving force is smaller in the CD mode than in the CS mode at the same accelerator pedal position.

Figure 7:
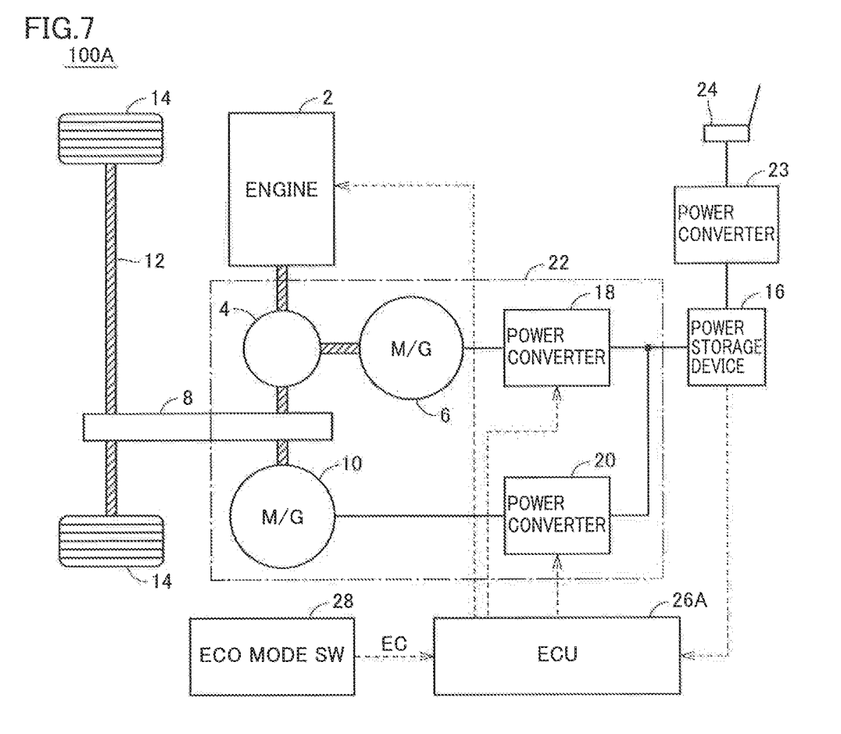
FIG. 7 is a block diagram for illustrating the entire configuration of a hybrid vehicle according to the second embodiment.

FIG. 7 is a block diagram for illustrating the entire configuration of a hybrid vehicle according to the second embodiment. Referring to FIG. 7, this hybrid vehicle 100A has a configuration of hybrid vehicle 100 shown in FIG. 1 additionally including an ECO mode switch 28 and an ECU 26A in place of ECU 26.

ECO mode switch 28 serves as an input switch for a user to select the ECO mode so as to cause the vehicle to travel while prioritizing reduction in fuel consumption over acceleration. In response to the ON operation by the user, ECO mode switch 28 outputs a signal EC to ECU 26A.

ECU 26A controls the vehicle driving force to be smaller when the ECO mode is selected than when the ECO mode is not selected, that is, in the case of the normal mode, at the same accelerator pedal position (the operation amount of the accelerator pedal). Furthermore, in the case where the ECO mode is selected, ECU 26A controls the vehicle driving force to be smaller in the CD mode than in the CS mode at the same accelerator pedal position. Specifically, in the case where the ECO mode is selected, ECU 26A sets the required power to be smaller in the CD mode than in the CS mode at the same accelerator pedal position.

Figure 8:
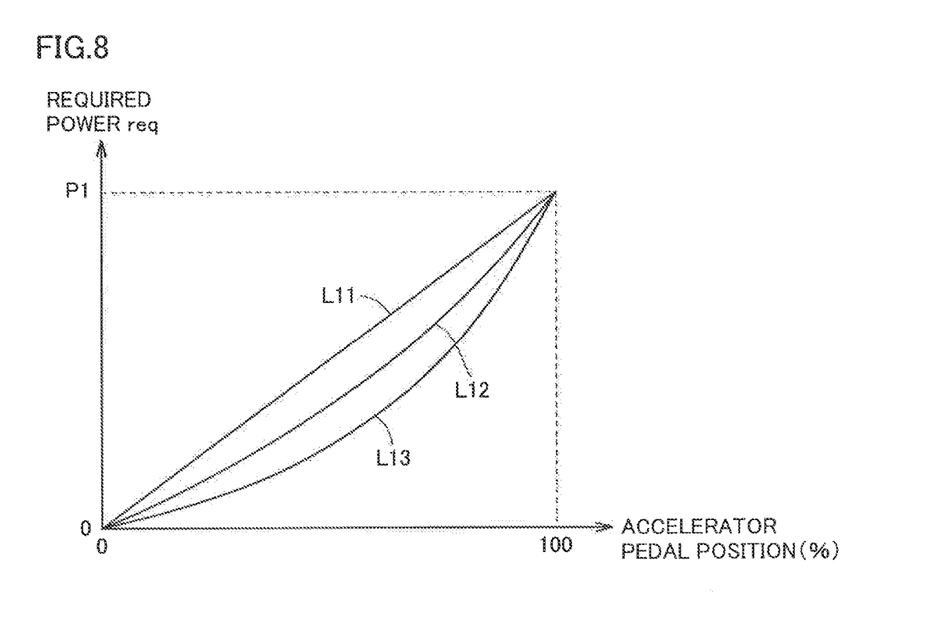
FIG. 8 is a diagram showing the relation between an accelerator pedal position and required power in the second embodiment.

FIG. 8 is a diagram showing the relation between the accelerator pedal position and the required power in the second embodiment. Referring to FIG. 8, according to the present second embodiment, in the normal mode (at the time when the ECO mode is not selected), required power req is set depending on the accelerator pedal position in accordance with a normal line L11 showing the basic relation between the accelerator pedal position and the required power.

The required power is set to be smaller in the ECO mode than in the normal mode at the same accelerator pedal position. Specifically, in the case where the ECO mode is selected, in the CS mode, required power req is set depending on the accelerator pedal position in accordance with a first output suppression line L12 exhibiting the required power that is smaller than that in the case of normal line L11. In the CD mode, required power req is set depending on the accelerator pedal position in accordance with a second output suppression line L13 exhibiting the required power that is further smaller than that in the case of first output suppression line L12.

When the vehicle travels in the CD mode while the ECO mode is selected, the vehicle is required to travel particularly with low fuel consumption. Meanwhile, according to the present second embodiment, in such a case, required power req is set depending on the accelerator pedal position in accordance with second output suppression line L13. Accordingly, the required power (the vehicle driving force) is suppressed, to thereby suppress switching from EV traveling to HV traveling, so that the vehicle can travel with low fuel consumption.

Figure 9:
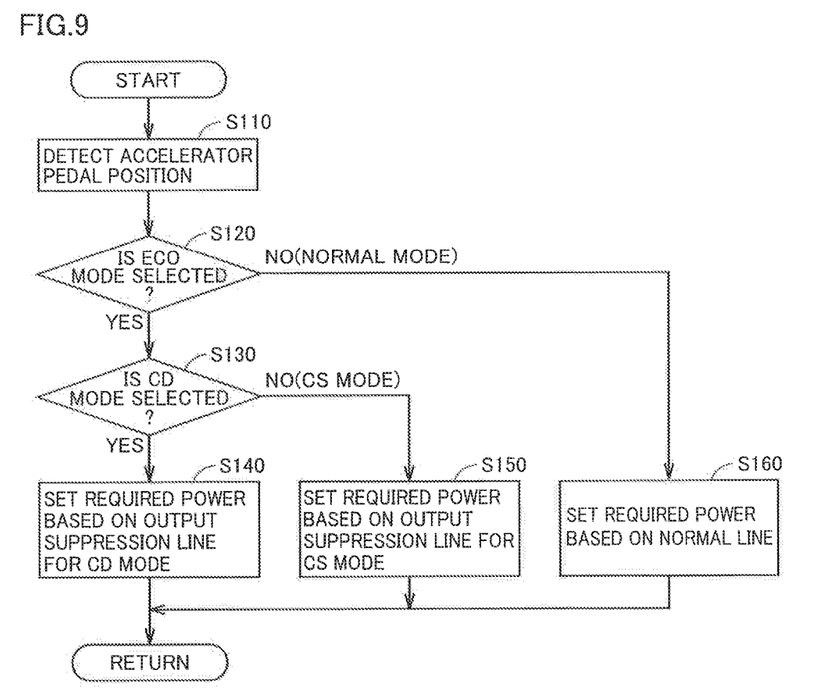
FIG. 9 is a flowchart for illustrating the procedure of a required power setting process performed by an ECU in the second embodiment.

FIG. 9 is a flowchart for illustrating the procedure of a required power setting process performed by ECU 26A in the second embodiment. The process shown in this flow chart is also performed as it is called from a main routine and executed at every prescribed time or every time predetermined conditions are satisfied.

Referring to FIG. 9, ECU 26A detects the accelerator pedal position (step S110). Then, based on signal EC from ECO mode switch 28, ECU 26A determines whether the ECO mode is selected or not (step S120). When the ECO mode is not selected, that is, when it is determined that the normal mode is selected (NO in step S120), ECU 26A sets required power req based on the accelerator pedal position detected in step S110 in accordance with normal line L11 shown in FIG. 8 (step S160).

When it is determined in step S120 that the ECO mode is selected (YES in step S120), ECU 26A determines whether the CD mode is selected or not (step S130).

When it is determined that the CD mode is selected (YES in step S130), ECU 26A sets required power req based on the accelerator pedal position in accordance with second output suppression line L13 shown in FIG. 8 (step S140).

On the other hand, when it is determined in step S130 that the CD mode is not selected, that is, the CS mode is selected (NO in step S130), ECU 26A sets required power req based on the accelerator pedal position in accordance with first output suppression line L12 shown in FIG. 8 (step S150).

As described above, when the vehicle travels in the CD mode while the ECO mode is selected, the vehicle is required to travel particularly with low fuel consumption. According to the present second embodiment, in such a case, required power req is set depending on the accelerator pedal position in accordance with second output suppression line L13. Therefore, according to the present second embodiment, the required power (the vehicle driving force) is suppressed, to thereby suppress switching from EV traveling to HV traveling, so that the fuel efficiency can be improved.

[Modification of the Second Embodiment]

As in the modification of the first embodiment, according to the present modification, when the vehicle travels in the CD mode while the ECO mode is selected, the maximum value of the required power (vehicle driving force) is smaller than that in the case where the normal mode is selected (where the FCC) mode is not selected) or in the case where the vehicle travels in the CS mode while the ECO mode is selected. Thereby, the vehicle driving force is reliably suppressed also against the excessive accelerator pedal operation. Consequently, the fuel efficiency in the CD mode can be reliably improved.

Figure 10:
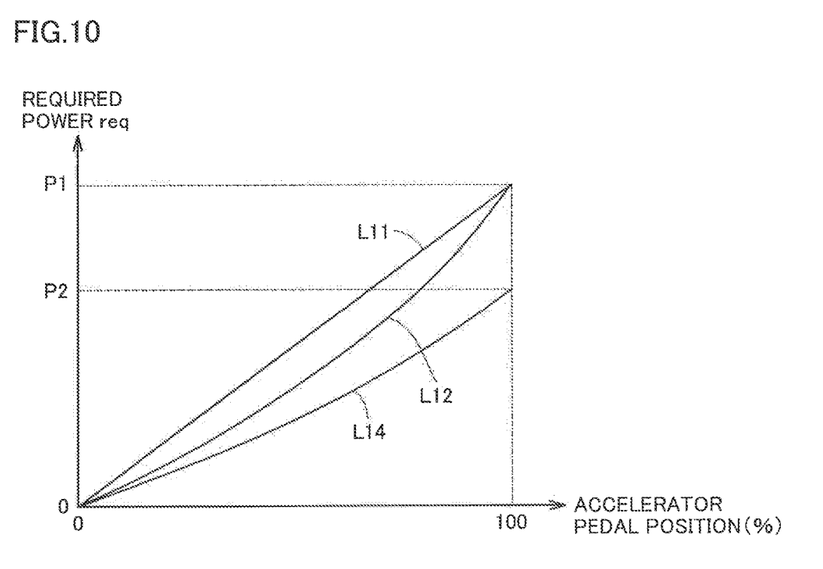
FIG. 10 is a diagram showing the relation between the accelerator pedal position and the required power in a modification of the second embodiment.

FIG. 10 is a diagram showing the relation between the accelerator pedal position and the required power in a modification of the second embodiment. Referring to FIG. 10 corresponding to FIG. 8 described above, in the normal mode, required power req is set depending on the accelerator pedal position in accordance with normal line L11, as in the second embodiment. Furthermore, also in the CS mode in the case where the ECO mode is selected, required power req is set depending on the accelerator pedal position in accordance with first output suppression line L12 as in the second embodiment.

On the other hand, in the CD mode in the case where the ECO mode is selected, a third output suppression line L14 is employed in place of second output suppression line L13 shown in FIG. 8. As to this third output suppression line L14, required power req for the same accelerator pedal position is smaller than that in the case of first output suppression line L12, and the value (P2) of the required power at 100% of the accelerator pedal position, that is, the maximum value of the vehicle driving force, is smaller than the value (P1) of first output suppression line L12. Accordingly, even if the user performs an excessive accelerator pedal operation, the vehicle driving force is reliably suppressed, so that the fuel efficiency can be reliably improved.

Also in the present modification, in the CD mode in the case where the ECO mode is selected, required power P2 at the time when the accelerator pedal position is 100% is determined, for example, based on the efficiency of motor generator 10 for vehicle traveling, as described with reference to FIGS. 5 and 6 in the above.

As described above, according to the modification of the present second embodiment, in the CD mode in the case where the ECO mode is selected, the vehicle driving force against an excessive accelerator pedal operation is suppressed, and the operation of engine 2 is suppressed. Therefore, according to the present modification, the fuel efficiency can be reliably improved. Furthermore, the efficiency of motor generator 10 can be maintained high. Also in this point, the fuel efficiency can be improved.

In addition, an explanation has been given in each of the above-described embodiments with regard to hybrid vehicles 100 and 100A. (FIGS. 1 and 7) each having a configuration in which engine 2 and two motor generators 6 and 10 are coupled by power split device 4. The hybrid vehicle to which the present invention is applied is however not limited to such a configuration.

For example, control that has been described in each of the above embodiments can also be applied to a hybrid vehicle and the like having a configuration in which engine 2 and one motor generator 10 are coupled in series through a clutch. Furthermore, the present invention can also be applied to a so-called series-type hybrid vehicle that uses engine 2 only for driving motor generator 6 to generate vehicle driving force only by motor generator 10.

Furthermore, in each of the above-described embodiments, hybrid vehicles 100 and 100A each have been described as a so-called plug-in hybrid vehicle that is externally chargeable. The hybrid vehicle to which the present invention is applied is however not limited to a plug-in hybrid vehicle. In other words, the present invention can be applied also to a hybrid vehicle that does not include a charging mechanism (power converter 23 and connection unit 24) serving to charge power storage device 16 by a power supply external to the vehicle.

In the above description, motor generators 6, 10, power split device 4, and power converters 18, 20 correspond to an embodiment of the "drive device" in the present invention. Furthermore, engine 2 corresponds to an embodiment of the "internal combustion engine" in the present invention, and ECU 26 corresponds to an embodiment of the "control device" in the present invention. Furthermore, motor generator 10 corresponds to an embodiment of the "electric motor" in the present invention. Power converter 23 and connection unit 24 form an embodiment of the "charging mechanism" in the present invention.

Each embodiment disclosed herein is also intended to be combined as appropriate and thereby implemented. It should be understood that the embodiments disclosed herein are illustrative and non-restrictive in every respect. The scope of the present invention is defined by the terms of the claims, and is intended to include any modifications within the meaning and scope equivalent to the terms of the claims.

What is claimed is:

1. A hybrid vehicle comprising:
   a power storage device;
   a drive device that receives electric power stored in said power storage device to generate vehicle driving force;
   an internal combustion engine, said drive device being further configured to generate electric power for charging said power storage device using an output of said internal combustion engine; and
   a control device that causes said vehicle to travel while selecting one of a. CD (Charge Depleting) mode in which an SOC of said power storage device is consumed and a CS (Charge Sustaining) mode in which said SOC is maintained to a prescribed level, said control device controlling, vehicle driving force to be smaller in said CD mode than in said CS mode at the same accelerator pedal position.

2. The hybrid vehicle according to claim 1, wherein, in a case of selecting a prescribed mode in which reduction in fuel consumption is prioritized over acceleration of the vehicle, said control device controls the vehicle driving force to be smaller in said CD mode than in said CS mode at the same accelerator pedal position.

3. The hybrid vehicle according to claim 1, wherein said control device controls the vehicle driving force such that a maximum value of the vehicle driving force is smaller in said CD mode than in said CS mode.

4. The hybrid vehicle according to claim 3, wherein
said drive device includes an electric motor that generates vehicle driving force,
the maximum value of the vehicle driving force in said CD mode is set such that a torque of said electric motor does not exceed a prescribed limit torque, and
said prescribed limit torque is set based on efficiency of said electric motor and is smaller than a maximum torque that can be output from said electric motor.

5. The hybrid vehicle according to claim 1, further comprising a charging mechanism for charging said power storage device using electric power from a power supply external to the vehicle.

\* \* \* \* \*